Figures 1, 2:
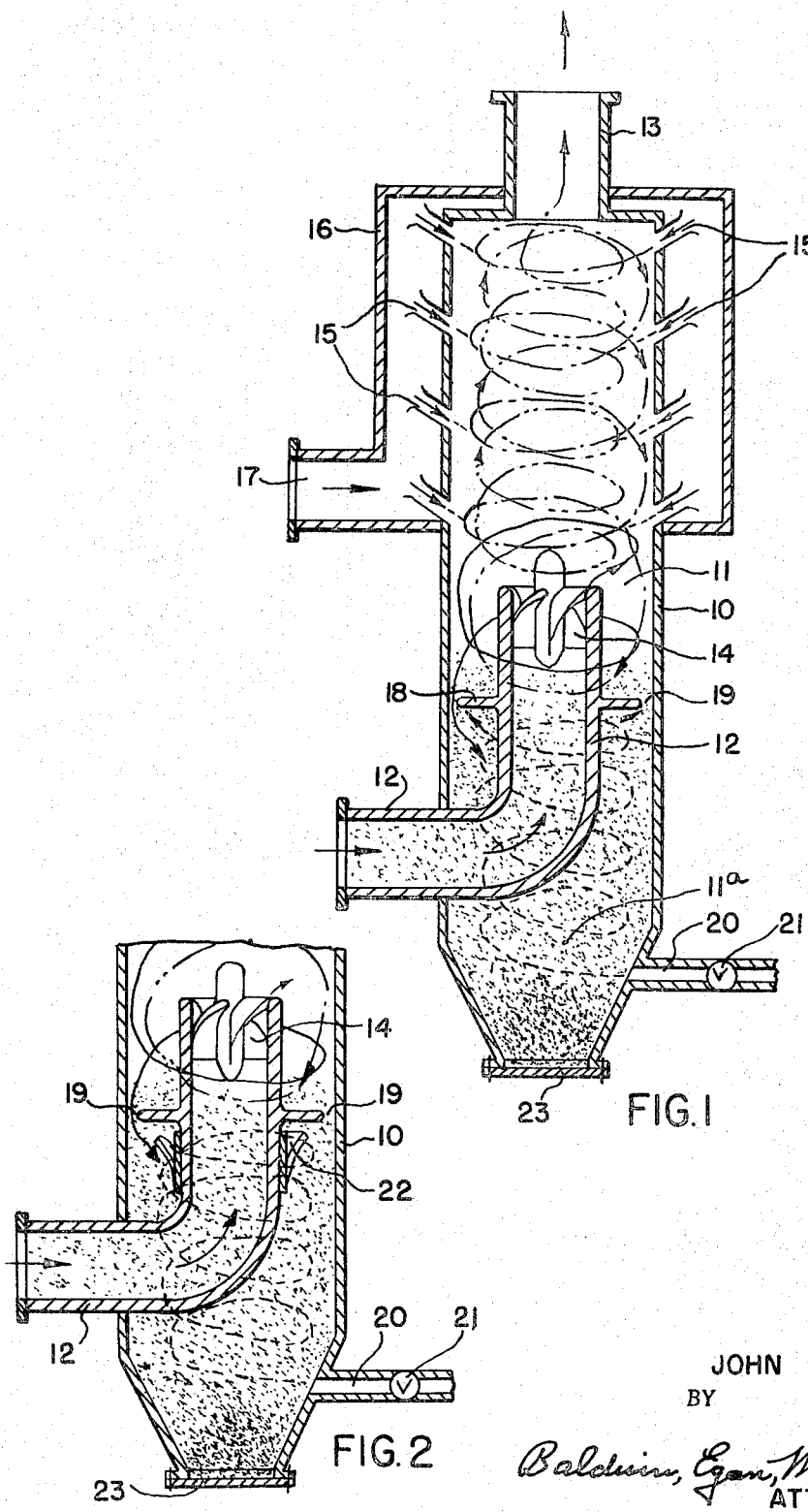

United States Patent [19]
Phillippi

[11] 3,720,314
[45] March 13, 1973

[54] CLASSIFIER FOR FINE SOLIDS

[75] Inventor: Hohn F. Phillippi, Cleveland, Ohio

[73] Assignee: Aerodyne Development Corporation, Cleveland, Ohio

[22] Filed: Nov. 9, 1970

[21] Appl. No.: 87,993

[52] U.S. Cl. .....................209/144, 55/261, 55/457, 55/459
[51] Int. Cl. .............................................. B04c 3/00
[58] Field of Search .....................55/261, 338–340, 55/455–459; 209/144, 138

[56] References Cited

UNITED STATES PATENTS

| | | | |
|---|---|---|---|
| 2,498,832 | 2/1950 | Watson et al. | 209/144 |
| 3,477,569 | 11/1969 | Klein et al. | 55/261 |

OTHER PUBLICATIONS

German printed application 1,407,989, dated 1–70, Siemens.
Aerodyne Development Article–Aerodyne Development Corp., Ohio, pages 1–2, dated 10–68.

*Primary Examiner*—Bernard Nozick
*Attorney*—Baldwin, Egan, Walling & Fetzer

[57] ABSTRACT

A modification of apparatus for separating fine particles from a gaseous fluid secondary provide means for classifying the fine particles is presented. The apparatus for separating particles from fluid is like that disclosed and claimed in U.S. Pat. No. 3,199,268 granted Aug. 10, 1965 to Karl-Heinz Oehlrich et al. This prior invention involves a primary flow of particles entrained in a fluid medium generally axially of a cylindrical processing chamber from an inlet duct near one end to an outlet duct at the other axis. A solid ground closes a portion of the chamber near the inlet duct save for an annular open space next to the wall of the chamber. A wecondary circulatory flow is imparted to the fluid medium above the solid ground which causes the solid particles to be separated from the medium and to fall through the annular space into a collecting hopper. The modification provides a fluid inlet to the hopper to cause a stream of controlled velocity to pass upwardly through the annular space counter current to the falling stream of particles so as to drive particles of a predetermined size to be classified from the rest of the particles and to be carried through the outlet duct.

9 Claims, 2 Drawing Figures

PATENTED MAR 13 1973 3,720,314

INVENTOR.
JOHN F. PHILLIPPI
BY
Baldwin, Egan, Walling & Fetzer
ATTORNEYS

CLASSIFIER FOR FINE SOLIDS

An object of the present invention is to provide an apparatus for the classification of finely divided solids by the modification of a previously known apparatus for separating fine particles from a fluid medium. This prior device is illustrated in U.S. Pat. No. 3,199,268, granted Aug. 10, 1965 to Karl-Heinz Oehlrich et al. for Particle-from-gas Separators. This prior patented device passes a fluid medium containing finely divided particles of different sizes through a generally cylindrical processing chamber from an inlet duct to an outlet duct. This prior patented structure provides a circulatory flow along the walls of the processing chamber toward the inlet end thereof, preferably by the introduction of one or more jets of a second medium supply introduced tangentially of the walls of the processing chamber and inclined downwardly toward the inlet end of the processing chamber. On the inlet duct, there is provided a solid ground which extends radially outwardly from the duct to a zone spaced from the walls of the processing chamber and leaving an open annular passageway at that point. The particles separated from the fluid medium fall downwardly through this open annular space into a receiving hopper beneath. The present invention introduces into this hopper an additional fluid stream for classifying purposes under a velocity so controlled as to entrain falling particles of a predetermined size at the open annular space, driving these particles, of predetermined size only, counter current to the heavier particles so as to carry only the classified particles through the outlet duct.

Other objects and advantages of the present invention will be apparent from the accompanying drawings and description and the essential features thereof will be set forth in the appended claims.

In the drawings,

FIG. 1 is a central sectional view through apparatus involving this invention; while FIG. 2 is a sectional view similar to the lower portion of FIG. 1 and including some stationary vanes in the processing chamber upstream from the solid ground so constructed and arranged as to direct the classifying fluid medium outwardly toward the side walls of the processing chamber.

To fully understand the basic apparatus which is modified by the present invention, reference may be had to U.S. Pat. No. 3,199,268, granted Aug. 10, 1965 to Karl-Heinz Oehlrich et al. which is incorporated herein by reference. It will be sufficient to state here that this prior patent includes a processing chamber 10 having rotationally symmetrical side walls, such as a cylindrical form which is represented herein in the drawings, although approximately cylindrical forms would be rotationally symmetrical also. While this apparatus is shown herein as standing in a vertical position, it should be understood that the same apparatus may be positioned horizontally or otherwise as desired. Near the lower end of the processing chamber 11 there is fixed an inlet duct 12 for the introduction of a gaseous medium containing finely divided particles of varying sizes. At the upper end of the processing chamber is an outlet duct 13 which is either substantially coaxial with, or on a parallel axis with, the upper end of the inlet duct 12. The flow between the duct 12 and the duct 13 is herein referred to as a primary flow along an axis passing through the ducts 12 and 13. Agitating means is provided for imparting to the primary flow a circulatory secondary flow causing the solid particles in the primary flow to move toward the cylindrical side walls 10. One such means comprises stationary vanes 14 fixed at the discharge end of the inlet duct, all of these vanes inclined upwardly and outwardly and in the same clock direction.

A second such agitating means comprises a plurality of jet openings 15 in communication with a manifold 16 into which a second gaseous medium is introduced at 17. The jet openings 15 introduce gaseous jets at a higher energy level than the primary flow in the processing chamber 11 tangentially of the walls 10 and inclined downwardly toward the inlet end of the processing chamber. In the drawing of FIG. 1, the primary flow is represented by the dash-dot-dot-dash lines, while the secondary flow is represented by the dash-dot-dash lines.

A solid ground is provided at 18 which consists of a fin extending radially outwardly from the inlet duct 12 to a zone short of the side walls 10 leaving there an open annular space 19.

As explained in the previously mentioned patent, the construction is such that the finely divided solid particles move on the periphery near the side walls 10 on a helical line downwardly in the processing chamber but, when they reach the solid ground 18, the motion converts to an approximately logarithmic spiral along which the particles reach the center of the processing chamber whence they rise in a vortex filament near the primary flow axis. At a certain height, inversely proportional to the square root of the angular velocity, a spatial vortex source forms itself. There, the particles are flung outwardly until they reach the downwardly directed agitating circulatory secondary flow caused by the jets 15.

To carry out the classifying step of the present invention, a gaseous stream for classifying purposes is introduced at the duct 20 which leads into the solid particle collection chamber 11a which consists of that portion of the processing chamber below the solid ground 18. Means must be provided for controlling the velocity of the gaseous stream provided in duct 20. Such a means is represented by the valve 21 in the duct 20, although those skilled in this art will understand that where substantially constant conditions occur over a period of time, the control means might be the original selection of the size of the duct 20 itself. The duct 20 may be directed radially inwardly of the processing chamber or tangentially thereof. The flow of the classifying gaseous medium is indicated by the dotted lines of FIGS. 1 and 2. As the classifying medium reaches the open annular space 19 radially outside of the solid ground 18, it engages the stream of solid particles flowing downwardly through this same space 19 in a counter current effect, the result of which is that particles of a predetermined size only are carried upwardly through the space 19 counter current to the heavier particles coming downwardly through this space. Such classified particles of predetermined size are carried upwardly through the chamber 11 and outwardly through the outlet duct 13.

As shown in FIG. 2, means may be provided if necessary or desirable to provide an even distribution of the flow of the classifying medium toward the open annular space 19. This is shown as a plurality of turning vanes 22 rigidly secured to the inlet duct 12 as by providing two semi-circular subassemblies which may be clamped around the inlet duct 12 in a well known manner. These vanes 22 are inclined upwardly and outwardly and all in the same clock direction so as to insure even distribution of the stream entering at duct 20 circumferentially around all portions of the annular space 19.

Either or both of the agitating means 14 and 15 may be utilized as above described. Use of the agitating spinner 14 requires less power needed at the jets 15.

One of the uses of the classifier of this invention would be in connection with a grinding operation where the discharge from the grinder is fed into the inlet duct 12 so as to classify and separate through the outlet duct 13 a predetermined size of fines while returning to the grinder the larger particles collected in the hopper 11a, such as by a discharge valve connected in place of the closure plate 23 at the bottom of the processing chamber.

Another use of this invention would be to collect all of the finely divided solid particles discharging from a rotary cement kiln and passing them through the inlet duct 12 of the present apparatus. Such fine particles, for instance, might run from 100 microns down to close to zero, of which a range of approximately 20 microns and down are strongly alkaline which would ruin the cement product. In the use of the present invention, the classifying gaseous medium entering through the duct 20 is so controlled that these very fine particles of 20 microns and smaller are carried upwardly through the annular space 19 and out through the outlet duct 13 where they are discharged to a suitable point. The heavier particles from 100 microns to about 20 microns would be collected in the hopper 11a and carried by any suitable means attached in place of plate 23 back to the inlet end of the cement kiln. In one such use of this invention, the classification of the very fine particles from 20 microns and down was about 99 percent efficient, whereas the separation of the heavier particles from 100 microns to about 20 microns was also about 99 percent efficient.

While this invention has been described using a gaseous medium, it should be understood that it may also use a liquid medium.

What is claimed is:

1. In apparatus for separating solid particles entrained in a fluid media, comprising an elongated processing chamber having approximately cylindrical side walls and having an inlet duct near one end for the introduction of solid particles of varying sizes entrained in a fluid medium and means for swirling the fluid media from said inlet duct, said chamber having an outlet duct near its other end, said two ducts being substantially coaxial and defining together a primary flow axis along which said fluid medium travels from said inlet duct to said outlet duct, agitating means for imparting to the primary flow of the medium in said chamber a circulatory secondary flow causing said solid particles to move through said chamber toward said inlet and adjacent said side walls, means forming a solid ground near the terminal end of said inlet duct extending radially outwardly therefrom and terminating short of said side walls and leaving there an annular open space through which pass said solid particles moving toward said inlet end adjacent said side walls, means providing a collection chamber for said solid particles upstream of said inlet end beyond said solid ground, the arrangement being such as to form in said processing chamber a vortex sink near said solid ground and a vortex source remote from said inlet duct toward said outlet duct; the combination therewith of means for classifying as to size said solid particles passing through said open space, comprising means for introducing into said processing chamber at the inlet end thereof upstream of said primary flow from said solid ground a fluid stream for classifying purposes, means for substantially even dispersing said fluid stream about said annular space and directing the fluid stream downstream through said space towards the outlet duct together with means for controlling the velocity of said classifying stream, said side walls and said inlet and said solid ground confining said classifying stream to said annular open space, whereby particles of predetermined smaller size only are driven counter current from said solid particles passing through said annular open space and the same are carried through said processing chamber and through said outlet duct.

2. Apparatus as defined in claim 1, wherein said processing chamber is substantially vertical with said outlet duct uppermost.

3. Apparatus as defined in claim 1, wherein said agitating means comprises stationary vane means where said inlet discharges into said processing chamber so constructed and arranged as to impart a circulatory motion to the fluid medium discharged there.

4. Apparatus as defined in claim 1, wherein said fluid stream for classifying purposes is directed substantially radially with respect to said processing chamber.

5. Apparatus as defined in claim 1, wherein said fluid stream for classifying purposes is directed substantially tangentially with respect to said processing chamber.

6. Apparatus as defined in claim 1, including vane means in said processing chamber upstream from said solid ground so constructed and arranged as to direct said classifying fluid medium outwardly toward said side walls of said processing chamber.

7. Apparatus as defined in claim 1, wherein said solid particles introduced at said inlet duct are entrained in a gaseous medium, and said fluid stream for classifying purposes is gaseous.

8. Apparatus as defined in claim 1, wherein said agitating means comprises a plurality of fluid-injection nozzle means circumferentially spaced from each other about said axis, said nozzle means also being axially spaced from each other along said processing chamber, each of said nozzle means being directed substantially tangentially to said side walls and inclined toward said inlet end.

9. Apparatus as defined in claim 8, including a stationary vane means where said inlet discharges into said processing chamber so constructed and arranged as to impart a circulatory motion to the fluid medium discharged there.

* * * * *